Patented Nov. 25, 1952

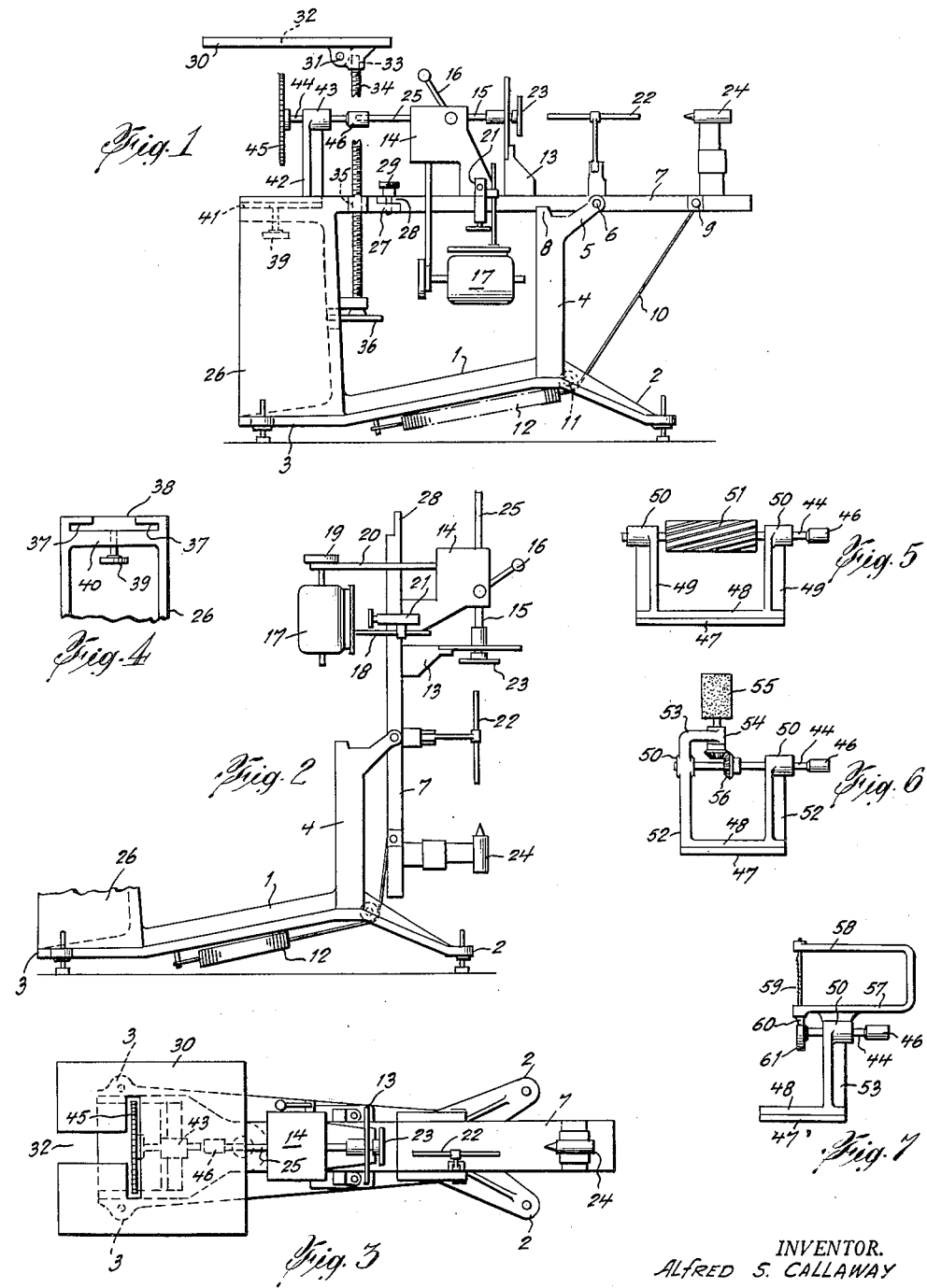

2,619,135

UNITED STATES PATENT OFFICE 2,619,135

MULTIPLE MACHINE TOOL

Alfred S. Callaway, Hartsdale, N. Y.

Application November 27, 1948, Serial No. 62,289

4 Claims. (Cl. 144—1)

The present invention is directed to mechanical tools, more particularly to a unit in which a considerable number and variety of tools may be operated. The present application is a continuation of and an improvement on my co-pending application Serial No. 788,622, filed November 28, 1947, entitled "Combination of Machine Tools."

In said application I have described a structure which embodies a base, a standard thereon and a column pivoted on the standard and carrying essentially a drill press head and a motor for rotating the spindle thereof. This unit was capable of being shifted to various positions on the column and to be locked in various operative positions. There was provided a number of elements, including a table in operative relation to which various machine tools were adapted to be mounted for rotation by the spindle of the drill press. There was also provided an arrangement including a tail-stock to operate as a lathe. In the case of some of the machine tools, the column is in horizontal position and in the use of other such elements, the column is in vertical position.

The present invention is intended and adapted to be an improvement over the invention of my aforesaid pending application, it being among the objects thereof to provide a machine tool combination of the character described which is more readily operable and more easily converted from one tool to another.

It is also among the objects of the present invention to provide an arrangement which is considerably simplified and wherein the shifting of the column between the horizontal and vertical positions thereof is more readily accomplished while maintaining a high degree of stability in all positions, the movement of said column being substantially simplified.

It is still further among the objects of the present invention to provide a machine tool combination which is compact and in which vibration during use has been substantially minimized, which is relatively cheaper to produce and which is sturdy so that it provides a firm base which is substantially vibrationless in operation.

In practicing the present invention, there is provided a base, a standard, a column, and a drill press head as in my previous invention. However, instead of securing all of the elements to the column, only a portion thereof is mounted on said column, namely, the drill press head, tail-stock and associated elements. There is further provided on the base a tool-stand fixed thereto and a table operating from said tool-stand and adapted to be raised and lowered and tilted at various angles. On the tool-stand is provided means for alternately clamping various machine tools in such positions that the shafts thereof may couple with the quill of the drill press head. The table may be shifted into various positions, depending on the particular tool mounted on the stand so that it cooperates therewith or is displaced so as not to interfere with the operation thereof. When coupled with such removable machine tools, the column is in horizontal position and is anchored to the tool stand.

The invention is more fully described below in conjunction with the drawings constituting a part hereof in which like reference characters indicate like parts.

Fig. 1 is a side elevational view of a unit constituting a combination of machine tools made in accordance with the present invention and showing the column in horizontal position with elements to provide a lathe and a circular saw arrangement.

Fig. 2 is a fragmentary side elevational view of the unit shown in Fig. 1 but illustrating the column in its vertical position.

Fig. 3 is a top plan view of the arrangement as shown in Fig. 1.

Fig. 4 is a fragmentary end elevational view of the top of the tool-stand looking to the right of Fig. 1.

Fig. 5 is a side elevational view of a removable planer adapted to be mounted on the tool-stand.

Fig. 6 is a view similar to Fig. 5 of a spindle sander, and

Fig. 7 is a similar view of a jig saw.

The base 1 of any suitable material is provided with pairs of legs 2 and 3 with means for adjusting the relative positions thereof so as to maintain the tool level on a floor. A standard 4 vertically positioned and fixed to base 1 has an arm 5 with a pivot 6 on which is mounted column 7 for rotation in horizontal and vertical positions. A stop 8 at the top of standard 4 provides a rest for the column when in horizontal position. At point 9 at the right of column 7 is secured the end of a cable 10 passing over pulley 11 mounted in base 1 and secured to the end of coil spring 12 secured in said base. The spring tends to maintain the column in vertical position and as shown in Fig. 1, the spring is extended and the column locked in horizontal position.

Mounted on column 7 is platen 13, similar to the platen of a drill press and means are provided for locking the platen in any one of a plurality of positions on the column as usual. Drill press head 14 having the usual spindle 15 and cooperating handle 16 is also mounted on column 7 and a motor 17 in a unit with head 14 through support 18 is operatively connected therewith through pulley 19 and belt 20. A device 21 is provided for moving the motor and head unit into a plurality of adjusted positions on column 7. Preferably motor 17 is on the opposite side of column 7 from head 14 in order to provide a balance of weight in the vertical position as shown in Fig. 2.

Also mounted on column 7 is a tool-rest 22 of the usual type and adapted to be placed in various positions. A chuck or head-stock 23 is mounted on spindle 15 with platen 13 in the position shown in Fig. 1 where it is out of the way with spindle 15 extending through an opening in platen 13. The adjustably placed tail-stock 24 completes the arrangement whereby the tool may be used as a lathe.

An extension 25 on spindle 15 and constituting a quill projects from the upper end of head 14 as shown in Fig. 2. When the column is in the horizontal position, the quill extends in the direction of tool-stand 26 fixed to base 1. Said stand has an angular projection 27 cooperating with a complementary projection 28 on column 7 and a locking screw 29 passes through 28 and is threaded into 27 to lock column 7 firmly in horizontal position against the action of spring 12.

A table 30 having a pivot 31 thereon for tilting the same, with means for locking the table in any of its adjusted positions, is provided with a slot arrangement 32 here shown as T-shaped for accommodation of various tools. Boss 33 at the under side of table 30 has mounted therein the upper end of a screw 34 passing through threaded bearing 35 on stand 26 and having a hand wheel 36 at the lower end. By operation of the screw, the table may be lowered into cooperative position with a tool or may be raised to be out of the way.

At the top of stand 26 is a pair of grooves 37 extending inwardly from the left hand side of Fig. 1, said grooves connecting with longitudinal opening 38 to form a T-shaped slot. A screw 39 threaded into cross-bar 40 provides means for locking machine tools temporarily in position on the stand.

As shown in Fig. 1, a circular saw has a support 41 of such shape as to fit into slots 37 and opening 38 and is adapted to be locked in position by manipulation of screw 39. It has a vertical arm 42 terminating in a bearing 43 in which there is mounted shaft 44 having a circular saw 45 secured to the end thereof. The opposite end 46 of shaft 44 is in the form of a sleeve into which the end of quill 25 may be inserted and the combination constitutes a clutch arrangement, the sleeve and quill end being of complementary angular form so that power may be transmitted from the quill to shaft 44. Table 30 may be lowered so that saw 45 projects above the surface of the table through slot 32. It is then in operative position.

Referring to the modification shown in Fig. 5, support 47 is adapted to fit into slots 37 and element 48 is adapted to fit into opening 38. A pair of vertical arms 49 extending from support 47 terminate in a pair of bearings 50 in which shaft 44 is mounted and a planer 51 is secured on the shaft between the bearings. This device may replace the circular saw of Fig. 1 by loosening screw 39, sliding the saw unit to the left out of slots 37 and sliding the planer unit into position in place thereof and locking it by screw 39.

In Fig. 6 is shown a spindle sander in which there is provided an overhanging arm 53, being an extension of one of the arms 52 which are mounted on support 47. A vertical bearing 54 at the end of arm 53 carries a spindle sander 55 which is rotatably mounted with respect to shaft 44 by a pair of bevel gears 56.

In still another modification constituting a jig saw and shown in Fig. 7, there is a single vertical arm 53 terminating in a bearing 50 and having on the end of shaft 44 a cam arrangement. There is further provided a C-shaped arm 57 secured to the top of arm 53. Overhanging portion 58 of said arm is made springy and a jig saw 59 has its end mounted therein. The other end of jig saw 59 extends through an opening in arm 57 and terminates in a follower 60. Cam 61 on shaft 44 cooperates therewith. In use the rotation of the cam pulls jig saw 59 downward during one-half of the revolution and allows it to be retracted by spring 58 in the other half of the revolution.

Although the invention has been described setting forth a single specific embodiment of the invention together with several elements which are capable of being used in connection therewith, the invention is not limited to the specific details described as many changes in such details may be made within the spirit of the invention. For instance, in place of circular saw 45, which may be made removable from shaft 44, other tools of various types may be mounted on said shaft. A large number of tools can be adapted to the present arrangement, including a band saw, shaper, profile filer, grinder, edge sander, disk sander and disk grinder. The mechanical arrangements shown and described may be varied and equivalent arrangements substituted for them. For instance, instead of the slots shown in Fig. 4 and the tongue-like support 47, a reverse arrangement may be used or other means for locking the support onto the stand such as a bolt arrangement may be used. Instead of the sleeve 46, other clutch arrangements for coupling the quill with the shaft may be used. Mechanisms have been shown for locking several of the parts together and in other cases means were described but not shown for adjustably fixing elements onto the column and many arrangements for accomplishing these results are known, all of which are included in the present invention.

The base 1, standard 4 and tool-stand 26 may be made in a single piece or they may be assembled as desired. The mounting of the column on the standard and the locking thereof in these positions may be accomplished in a different manner than shown and described. Spring 12 may be placed differently than shown and an arrangement may be substituted for the same which will operate in conjunction with pivot 6 so that the spring will tend to hold the column either in vertical or in horizontal position by causing the tension to be exerted on one side or the other of said pivot.

I claim:

1. A multiple machine tool comprising a base, a standard extending upwardly thereon from adjacent one end, an elongated column pivotally mounted on said standard at an intermediate portion of said column to swing between a vertical and a horizontal position, a headstock carrying a motor driven spindle slidably mounted on said column on one side of said pivot, a tailstock slidably mounted on said column on the other side of said pivot, a tool stand extending upwardly from adjacent the other end of said base, means for locking the headstock carrying end of said column to said stand when the column is in horizontal position, a quill attached to said spindle and extending out of said headstock in a direction opposite to and in alinement with said spindle, an interchangeable machine tool having a shaft in alinement with said quill when the column is locked to the stand and detachably mounted on said stand, said shaft and quill having cooperating clutch elements adapted to slide longitudinally into and out of engagement when alined.

2. A multiple machine tool according to claim 1 in which said interchangeable machine tool has a base slidable on said stand in a direction parallel to the axis of said quill and spindle.

3. A multiple machine tool according to claim 1 in which said column has a platen slidably mounted thereon and extending at a right angle thereto, said platen having a central opening, said spindle adapted to pass through said opening when said platen is adjacent to said headstock.

4. A multiple machine tool according to claim 1 in which there is a horizontal table, means for mounting said table on said stand above said tool, said mounting means adapted to adjust the height of said horizontal table, and said table has an opening therein to permit said tool to extend partly above said table.

ALFRED S. CALLAWAY.

REFERENCES CITED

The following references are of record in the file of this patent:

UNITED STATES PATENTS

| Number | Name | Date |
|---|---|---|
| 180,735 | Strange | Aug. 8, 1876 |
| 188,033 | Tannahill | Mar. 6, 1877 |
| 242,242 | Wilder | May 31, 1881 |
| 364,441 | Rohlmann | June 7, 1887 |
| 1,167,091 | McGill | Jan. 4, 1916 |
| 1,726,702 | Heston | Sept. 3, 1929 |
| 1,973,409 | Evinrude | Sept. 11, 1934 |
| 2,071,201 | Frech | Feb. 16, 1937 |
| 2,151,688 | Carey | Mar. 28, 1939 |
| 2,200,799 | Miller | May 14, 1940 |
| 2,542,373 | Tollafield | Feb. 20, 1951 |